United States Patent [19]

Dojki et al.

[11] Patent Number: 4,464,254

[45] Date of Patent: Aug. 7, 1984

[54] DEVICE FOR SEPARATING SERUM FROM BLOOD SAMPLE

[75] Inventors: Kassim H. V. M. Dojki, Riverdale; Iaokim Haldopolouis, Peachtree City, both of Ga.

[73] Assignee: Porex Technologies, Corp., Fairburn, Ga.

[21] Appl. No.: 384,562

[22] Filed: Jun. 3, 1982

[51] Int. Cl.³ .................. B01D 21/26; B01D 33/00
[52] U.S. Cl. .................. 210/136; 210/359; 210/516; 210/927; 210/DIG. 24
[58] Field of Search ............... 210/136, 359, 390, 515, 210/516, 927, DIG. 24; 422/101

[56] References Cited

U.S. PATENT DOCUMENTS

| | | | |
|---|---|---|---|
| 3,661,265 | 5/1972 | Greenspan | 210/927 X |
| 3,849,072 | 11/1974 | Ayres | 210/359 X |
| 3,935,113 | 1/1976 | Ayres | 210/927 X |
| 3,969,250 | 7/1976 | Farr | 210/927 X |
| 4,189,385 | 2/1980 | Greenspan | 210/927 X |
| 4,202,769 | 5/1980 | Greenspan | 210/516 X |

Primary Examiner—Benoit Castel
Assistant Examiner—W. Gary Jones

Attorney, Agent, or Firm—Lane, Aitken & Kananen

[57] ABSTRACT

In a serum separator, a sampling tube fits inside of a test tube. The sampling tube is provided with an elastomeric piston head at the lower end thereof having an annular lip to engage and form a seal with the inner sidewalls of the test tube. The upper side of the lip is provided with irregularities to break the seal between the lip and the test tube wall upon removal of the sampling tube from the test tube. A porous plastic filter body is mounted in a cavity in the piston head. The piston head defines a one-way valve in the form of a ball chamber containing a ball check. When the sampling tube is pushed into the test tube with a blood sample in the test tube, serum will pass through the filter body and valve into the interior of the sampling tube. The valve is constructed so that the serum cannot squirt toward the top of the sampling tube. When the sampling tube has been inserted, the valve will close. When the sampling tube is withdrawn, the reduced pressure in the bottom of the test tube will cause the ball to wedge in sealing engagement in the closed position to retain the serum sample in the sampling tube and isolate it from the residue in the bottom of the test tube.

9 Claims, 3 Drawing Figures

DEVICE FOR SEPARATING SERUM FROM BLOOD SAMPLE

BACKGROUND OF THE INVENTION

This invention relates to a device for filtering and separating liquid mixtures that have been stratified and more particularly to a serum separator for filtration and separation of serum from blood samples. In the Grover U.S. Pat. No. 3,693,804, and the Haldopolous U.S. Pat. No. 3,832,141, assigned to the assignee of the present application, serum separators are disclosed for performing this function. In these serum separators, the sample is collected in a test tube and an elongated sampling tube is provided to fit within the test tube. In the lower end of the sampling tube is a piston head which makes a sliding seal with the sidewalls of the test tube. A filter is mounted in a passageway extending through the piston head to the interior of the sampling tube. As the sampling tube and piston head are pushed into the test tube, fluid will pass through the filter into the interior of the sampling tube leaving the residue in the bottom of the test tube. Then when the sampling tube is withdrawn, the filtrate, which will be serum, will be withdrawn with the sampling tube. The piston head in both the Haldopolous patent and Grover patent is provided with an annular lip which makes the sealing engagement with the sidewalls of the test tube. In the Grover patent, this seal is broken to remove the sample by a sideways motion of the sampling tube within the test tube. In the apparatus of the Haldopolous patent, the lip is provided on its upper edge with irregularities. When the sampling tube with the piston head is removed from the test tube, the lip reverses its position and the upper side of the lip engages the sidewall of the test tube. As a result, the irregularities in the upper surface of the lip break the seal between the lip and the sidewall.

As an improvement in the above described serum separators of the prior art, it has been proposed to provide a one-way valve in the filter head between the filter and the interior of the sampling tube so as to prevent backflow from the sampling tube down through the filter when the sampling tube is removed from the test tube. The one-way valve also serves to isolate the serum from the residue of the blood sample so as to provide an ion exchange barrier after the filtering operation. The system of the present invention provides such a serum separator with an improved version of the one-way valve. The separator of the present invention is easily manufactured consistently in a form that achieves prevention of backflow and complete isolation of the serum from the residue so that an effective ion barrier is achieved.

SUMMARY OF THE PRESENT INVENTION

In the system of the present invention, the serum separator comprises a test tube and a sampling tube designed to fit inside the test tube as in the prior art systems. The sampling tube is provided with a piston head in the end thereof made of an elastomeric material and having an annular lip which engages the sidewalls of the test tube. The piston head defines a cylindrically shaped cavity in the bottom thereof opening to the bottom of the test tube. A porous filter body is mounted in this cavity.

The piston head defines a ball chamber containing a ball with the chamber having a lower opening communicating with the top of the cavity containing the filter body. When the sampling tube is pushed down into the test tube with the blood sample in the test tube, serum will pass through the filter body into the ball chamber and then into the interior of the sampling tube through an opening at the top of the ball chamber. When the sampling tube has been inserted, the ball will close the bottom opening of the ball chamber and retain the serum sample in the sampling tube. The opening at the top of the ball chamber is constructed so that the serum will not squirt out of the top thereof and it also serves to prevent the ball from sticking in the upper end of the ball chamber. After the sampling tube has been inserted, it is withdrawn a short distance. The initial movement of the sampling tube upon withdrawal thereof from the test tube will reduce the pressure in the bottom of the test tube. As a result, there will be a downward pressure upon the ball in the ball chamber to instantly seat the ball in a closed position over the lower opening. The ball seat at the lower end of the ball chamber is defined by the upper inside surface of a slightly tapered annular wall, which is made of the elastomeric material of the piston head and which forms an integral part thereof. When the downward pressure of the ball seats it against the upper inside surface of the annular wall, it wedges the wall slightly outwardly to provide a tight sealing engagement between the ball and the inside surface of the wall so that no serum will leak back into the residue in the bottom of the test tube. The withdrawal of the sampling tube creates an air gap between the serum and the residue in the bottom of the test tube and the serum will be isolated from the residue.

The upper edge of the lip of the piston head is notched so that as the sampling tube is pulled further out of the test tube and the lip reverses position, the seal between the lip and the tube wall will be broken. After the seal between the lip and the test tube sidewall has been broken, the elasticity of the annular wall forming the ball seat will hold the ball in position maintaining the sealing engagement.

After the serum has been isolated from the residue, the serum in the sampling tube can be stored for 72 hours or longer for later use of the filtrate and none of the filtrate will flow out of the bottom of the sampling tube.

DESCRIPTION OF THE PREFERRED EMBODIMENTS

Figure 1:
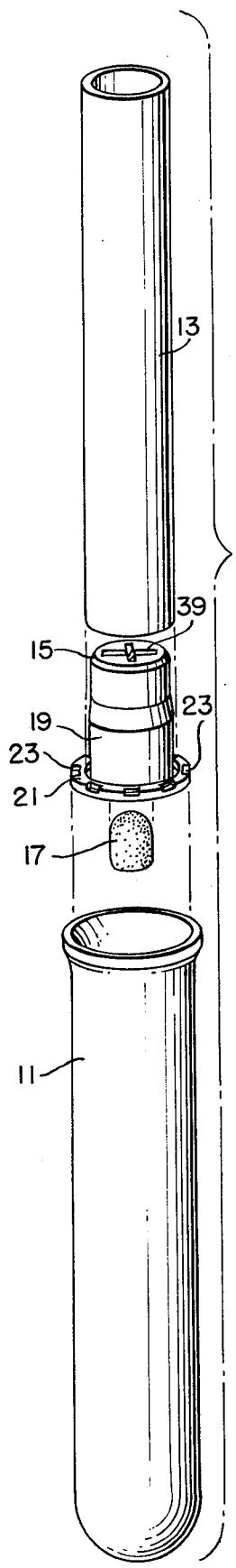
FIG. 1 is an exploded view illustrating the serum separator of the present invention.

As shown in FIG. 1, the serum separator of the present invention comprises a test tube 11 of conventional design having a closed bottom and an open top. The tube 11 may be made of glass or of a glass-like material, such as clear plastic. A sampling tube 13 is designed to fit loosely inside the test tube 11 and is of equal or greater length than the test tube 11. The sampling tube, like the test tube, comprises a cylinder made of a glass-like material, such as clear plastic, or glass. The upper end of the sampling tube 13 is open and the bottom end is closed with a piston head 15 in which is held a filter body 17. The filter body is made of open-celled porous material, which is rigid relative to the piston head and which preferably is made of a synthetic resin of the type commonly referred to as plastic.

Figure 2:
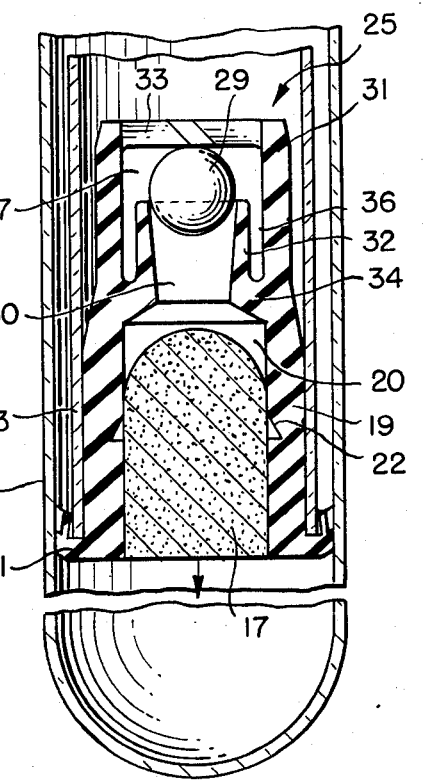
FIG. 2 is a view taken in axial section of the serum separator shown in FIG. 1 and showing the operation as the sampling tube is being inserted into the test tube.
Figure 3:
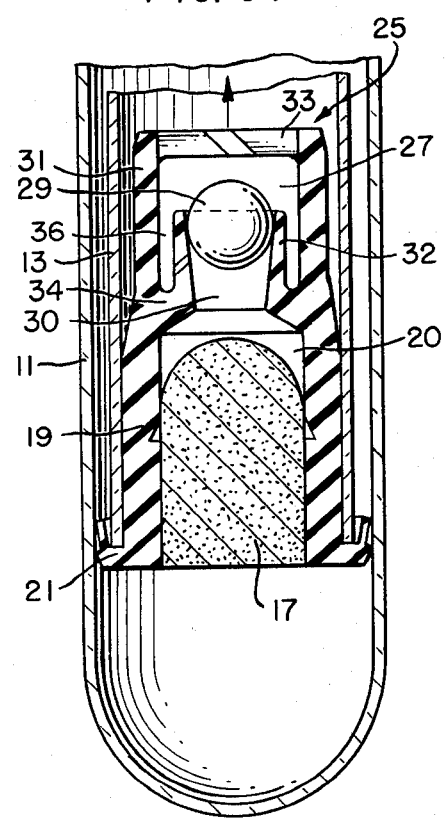
FIG. 3 is a view taken in axial section of the serum separator shown in FIG. 1 showing the operation as the sampling tube is being withdrawn from the test tube.

The piston head 15 is made of elastomeric material and is molded in a one-piece construction. The piston head 15 has a cylindrical body portion 19 which, as shown in FIGS. 2 and 3, fits snugly and is securely held within the lower end of the sampling tube 13. The cylindrical body portion 19 defines a cylindrical cavity 20 which is open at the bottom and in which the filter body 17 is securely held. The top of the filter body 17 is rounded or dome-shaped to facilitate insertion of the filter body 17 into the cavity 20. An annular notch 22 is provided around the inner cylindrical surface defining the cavity 20 to facilitate removal of the piston head from the mold in which it is formed. The lower end of the piston head 15 is provided with an annular lip 21 which extends radially out beyond the tube 13 and engages the inner cylindrical wall of the test tube 11 when the assembly of the sampling tube and the piston head is inserted into the test tube 11. The lower side of the lip 21 will engage the sidewall of the test tube 11 and make an air and liquid seal around the wall of the test tube when the sampling tube is being inserted into the test tube as shown in FIG. 2. The upper side of the annular lip 21 is provided with notches 23 so that when the sampling tube is being withdrawn from the test tube, as shown in FIG. 3, and the lip 21 reverses its position, the notches 23 will engage the sidewall of the test tube. This action will break the seal and eliminate the low pressure or partial vacuum in the bottom of the test tube.

The top of the piston head has a cylindrical extension 25 of reduced diameter positioned coaxial with the sampling tube 13. This cylindrical extension 25 defines a cylindrical ball chamber 27 containing a ball 29 and has an outer cylindrical wall 31 and top wall 33. A central annular opening 30 connects the ball chamber 27 to the cavity 20. The opening 30 is surrounded by and defined by an annular wall 32 which extends from the cavity 20 up into the ball chamber 27. The bottom of the wall 32 is joined to the outer wall of the piston head by means of an annular support 34, but the upper part of the wall 32 is spaced from the outer wall 31 by an annular gap 36. The inner surface of the wall 32 tapers outward slightly from the annular support 34 and the interior cylindrical surface of the wall 32 defines a wedging seat for the ball 29. The inner diameter of the wall 32 at the top thereof is slightly less than the diameter of the ball 29. For example, the diameter of the ball 29 could be 0.250 inches and the inner diameter of the wall 32 at the top thereof could be 0.221 inches. The annular support member 34 slopes upwardly from the outer wall 31 toward the opening 30 to provide greater structural strength to the support 34 against the downward force which will be exerted on the annular member 34 when the ball 29 seats.

An aperture 39 (see FIG. 1) is defined in the top wall 33 of the piston head to provide a passageway for serum to flow from the chamber 27 to the interior of the sampling tube 13. The aperture 39 is formed by four slots through the top wall 33 intersecting at the center of the top wall 33. The slots which form the aperture 39 are distributed at 90 degree intervals and each slot is defined by parallel sidewalls which are all skewed in the same rotary direction relative to the axis of the piston head. This shape for the aperture 39 facilitates insertion of the ball 29 into the chamber 27 through the aperture 39 after the piston head has been molded.

When the sampling tube is inserted into the test tube 11, the seal between the lip 21 and the sidewall of the test tube will cause the liquid mixture in the bottom of the test tube to be pressurized. As a result, when the piston head comes into contact with the blood sample, serum from the sample will be forced up through the porous filter body 17 and through the aperture 30 into the chamber 27.

The flow of serum into the chamber 27 will push the ball 29 to the top of the chamber 27 obstructing the flow of serum through the center of the aperture 39 and serum will flow from the chamber 27 into the interior of the sampling tube through the inclined slots of the aperture 39. Because the slots are inclined, the serum will be directed against the wall of the sampling tube 13 and will not squirt out of the top of the sampling tube during this operation. The material of the ball is selected so that it has a specific gravity greater than that of the serum so that after the downstroke of the sampling tube has been completed resulting in the collection of serum in the sampling tube, the ball 29 will fall back down to the bottom of the chamber 27 and close the opening 31. The aperture 39 also serves to prevent the ball 29 from sticking in the top of the chamber 27 after the downstroke of the sampling tube has been completed.

After the sampling tube is inserted, it is withdrawn a short distance. As explained above, this action will cause the lip 21 to reverse its position so that the upper side of the lip 21 engages the sidewall of the test tube and the notches 23 prevent the withdrawing of the sampling tube 13 from generating a partial vacuum in the bottom of the test tube. However, when the withdrawal is first initiated, there will be some movement of the sampling tube out of the test tube before the lip 21 can reverse its position. This action will tend to cause a small reduced pressure in the bottom of the test tube causing a pressure differential pushing down on the ball 29. This pressure will wedge the ball into the opening 30 in engagement with the inner surface of the wall 32 to seal the opening 30 closed. The ball 29 will wedge the upper end of the wall 32 outwardly and the resilience of the wall will cause it to press tightly against the ball to thus provide a seal. After the seal between the lip 21 and the test tube ball is broken, the ball 29 will remain wedged in position sealing the opening 30 closed. Accordingly, none of the serum within the sampling tube 13 can leak back through the piston head and the serum is separated from the residue by the seal between the ball 29 and the wall 32. The sampling tube may then be capped, if desired, and the serum in the sampling tube 13 can be stored for later use of the filtrate and without danger of filtrate leaking out through the piston head. The sampling tube 13 may be kept in the test tube during storage if desired. If the sampling tube is positioned to leave a small gap between the bottom of the piston head 15 and the residue, isolation of the serum from the residue will be assured.

The separator described effectively isolates the serum from the residue of the blood sample and prevents any of the serum from flowing back out of the sampling tube. In addition, serum is collected without danger of the serum squirting out of the top of the sampling tube. These features are achieved by means of a piston head construction, which can be manufactured simply and easily with high quality and low cost. The above description is of a preferred embodiment of the invention and modifications may be made thereto without departing from the spirit and scope of the invention, which is defined in the appended claims.

What is claimed is:

1. A filter separator comprising a test tube having walls, a sampling tube designed to fit within said test tube and having a piston head mounted in one end of said sampling tube constructed to engage and form a seal with the walls of said test tube when said sampling tube is being inserted into said test tube, said piston head being made of elastomeric material and defining a passageway through said piston head into the interior of said test tube, said passageway defining a ball chamber containing a ball, the lower side of the ball chamber defining a seat for said ball, said seat being defined by the elastomeric material of said piston head and being constructed to comprise means to form a sealing engagement with said ball in response to said ball being forced into engagement with said seat by a reduced pressure within said test tube beneath said piston head and to grip said ball in sealing engagement by the resilience of the elastomeric material of said seat causing said seat to press around said ball after said reduced pressure terminates and apart from any force applied to said ball pushing said ball into engagement with said seat.

2. A filter separator as recited in claim 1, wherein said seat is defined by a surface of an annular wall facing radially inward.

3. A filter separator as recited in claim 2, wherein said annular wall tapers outwardly from the bottom thereof to the top thereof.

4. A filter separator as recited in claims 2 or 3, wherein said wall is supported at the lower end thereof and is spaced from the outer wall of said ball chamber at the upper end thereof.

5. A filter separator as recited in claim 4, wherein the support for the lower end of said annular wall comprises an annular support connecting the lower end of said annular wall to the outer wall of said piston head.

6. A filter separator as recited in claim 5, wherein said annular support is sloped upwardly from the outer wall of said piston head to said annular wall.

7. A filter separator as recited in claims 1, 2 or 3, wherein the lower end of said piston head defines a cavity open at the bottom of a piston head and said filter body is held within said cavity.

8. A filter separator as recited in claim 1, wherein the upper side of said ball chamber is closed by a wall having an aperture formed therein, said aperture being defined by a plurality of slots intersecting in alignment with said ball seat, said slots being inclined relative to the axis of said sampling tube.

9. A filter separator as recited in claim 1, wherein a porous filter body is contained within said passageway to filter fluid passing through said passageway.

* * * * *